United States Patent
Pefkianakis et al.

(10) Patent No.: US 11,035,946 B2
(45) Date of Patent: Jun. 15, 2021

(54) ACCURATE LOCALIZATION OF CLIENT DEVICES FOR WIRELESS ACCESS POINTS

(71) Applicant: HEWLETT PACKARD ENTERPRISE DEVELOPMENT LP, Houston, TX (US)

(72) Inventors: Ioannis Pefkianakis, Palo Alto, CA (US); Kyu-Han Kim, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 258 days.

(21) Appl. No.: 16/134,304

(22) Filed: Sep. 18, 2018

(65) Prior Publication Data

US 2020/0088869 A1 Mar. 19, 2020

(51) Int. Cl.
| | |
|---|---|
| *G01S 13/76* | (2006.01) |
| *G01S 7/295* | (2006.01) |
| *H04W 64/00* | (2009.01) |
| *H04W 84/12* | (2009.01) |

(52) U.S. Cl.
CPC ............ *G01S 13/762* (2013.01); *G01S 7/295* (2013.01); *H04W 64/00* (2013.01); *H04W 84/12* (2013.01)

(58) Field of Classification Search
CPC ...... G01S 13/762; G01S 7/295; H04W 64/00; H04W 84/12; H04W 88/08; H04W 64/006
USPC ......................................................... 342/42
See application file for complete search history.

(56) References Cited

U.S. PATENT DOCUMENTS

| | | | |
|---|---|---|---|
| 9,595,767 B2 | 3/2017 | Choudhury et al. | |
| 9,629,171 B2 | 4/2017 | Roy et al. | |
| 9,949,227 B2* | 4/2018 | Hansen | H04W 64/003 |
| 2014/0301494 A1* | 10/2014 | Hsu | H04B 7/026 375/267 |

(Continued)

FOREIGN PATENT DOCUMENTS

WO    WO-2018028798    2/2018

OTHER PUBLICATIONS

Bielsa, G. et al., Indoor Localization Using Commercial Off-the-shelf 60 Ghz Access Points, (Research Paper), Jan. 16, 2018, 9 Pgs.

(Continued)

*Primary Examiner* — Frank J McGue
(74) *Attorney, Agent, or Firm* — Hewlett Packard Enterprise Patent Department

(57) ABSTRACT

This disclosure provides systems through which a wireless access point (AP) can determine the location of a client device with a high degree of accuracy. The AP uses CIR measurements for a plurality of directional beams used to communicate with the client device to determine a respective amplitude of a Line-of-Sight (LOS) path between the AP and the client device for each beam. The AP identifies a high-LOS-amplitude subset of the beams and, based on predefined radiation patterns associated with the beams included in the high-LOS-amplitude subset, determines a direction of the LOS path between the AP and the client device. The AP also determines a Time-of-Flight (ToF) for radio frames exchanged between the AP and the client device via the plurality of directional beams and uses the ToF to determine a distance between the AP and the client device.

18 Claims, 5 Drawing Sheets

(56) References Cited

U.S. PATENT DOCUMENTS

2018/0088222 A1* 3/2018 Anholt .................. H04W 4/029

OTHER PUBLICATIONS

Chen, J. et al., Pseudo Lateration: Millimeter-wave Localization Using a Single Rf Chain, (Research Paper), Jan. 21, 2017, 6 Pgs.
Guerra et al, Single-Anchor Localization and Orientation Performance Limits Using Massive Arrays: MIMO vs. Beamforming, 2018, 3 Pgs.
Abari et al., "Millimeter Wave Communications: From Point-to-Point Links to Agile Network Connections", Proceedings of the 15th ACM Workshop on Hot Topics in Networks, Nov. 9-10, 2016, pp. 169-175.
Anand Oswal, "Beacons and Mobility: How Cisco Aims to Transform Indoor Location Services", available online at <https://blogs.cisco.com/news/beacons-and-mobility-how-cisco-aims-to-transform-indoor-location-services>, Oct. 26, 2016, 6 pages.
Anderson et al., "In-Building Wideband Partition Loss Measurements at 2.5 GHz and 60 GHz", IEEE Transactions on Wireless Communications, vol. 3, No. 3, 2004, 8 pages.
Aruba Networks, Inc. 2017, "Location Services Platform", available online at <https://web.archive.org/web/20170715180859/https://www.arubanetworks.com/products/location-services/>, Jul. 15, 2017, 4 pages.
Biswas et al., "Depth Camera Based Indoor Mobile Robot Localization and Navigation", IEEE International Conference on Robotics and Automation, 2012, 8 pages.
Chen et al., "Locating and Tracking BLE Beacons with Smartphones", Proceedings of the 13th International Conference on emerging Networking EXperiments and Technologies, 2017, 13 pages.
Choubey et al., "Introducing Facebook's new terrestrial connectivity systems—Terragraph and Project ARIES", AI Research, Connectivity, Networking & Traffic, available online at <https://engineering.fb.com/connectivity/introducing-facebook-s-new-terrestrial-connectivity-systems-terragraph-and-project-aries/>, Apr. 13, 2016, 6 pages.
Cisco Systems, Inc. 2016, "HyperLocation: Best Practices and Troubleshooting Guide", 17 pages.
Deng et al., "Mm-wave MIMO channel modeling and user localization using sparse beamspace signatures", IEEE 15th International Workshop on Signal Processing Advances in Wireless Communications (SPAWC), 2014, 5 pages.
El-Sayed et al., "Evaluation of Localization Methods in Millimeter-Wave Wireless Systems", IEEE 19th International Workshop on Computer Aided Modeling and Design of Communication Links and Networks (CAMAD), 2014, 5 pages.
FCCnews, "FCC Promotes Higher Frequency Spectrum for Future Wireless Technology", 2015, 2 pages.
Furman et al., "Unlocking the Promise of Broadband for All Americans", available online at <https://obamawhitehouse.archives.gov/blog/2016/07/15/unlocking-promise-broadband-generate-gains-all-americans>, Jul. 15, 2016, 6 pages.
Genc et al., "Home Networking at 60 GHz: Challenges and Research Issues", Springer Annals of Telecommunications, vol. 63, 2008, pp. 501-509.
Gerstweiler et al., "HyMoTrack: A Mobile AR Navigation System for Complex Indoor Environments", Sensors, vol. 16, Issue 1, 2016, 19 pages.
Giustiniano et al., "CAESAR: Carrier Sense-based Ranging in Off-the-shelf 802.11 Wireless LAN", Proceedings of the Seventh COnference on emerging Networking EXperiments and Technologies, 2011, 12 pages.
Gu et al., "A Survey of Indoor Positioning Systems for Wireless Personal Networks", IEEE Communications Surveys & Tutorials, vol. 11, Issue 1, 2009, pp. 13-32.

IEEE Standards Association, "Part 11: Wireless LAN Medium Access Control (MAC) and Physical Layer (PHY) Specifications", 2016, 90 pages.
IEEE Standards Association, 2012, "IEEE Standards 802.11ad-2012, Amendment 3: Enhancements for Very High Throughput in the 60 GHz Band", 2012, 19 pages.
Kejriwal et al., "Smart Buildings: How IoT Technology Aims to Add Value for Real Estate Companies", Deloitte University Press, 2015, 32 pages.
Kotaru et al., "Position Tracking for Virtual Reality Using Commodity WiFi", IEEE Conference on Computer Vision and Pattern Recognition (CVPR), 2017, pp. 68-78.
Kotaru et al., "SpotFi: Decimeter Level Localization Using WiFi", Proceedings of the 2015 ACM Conference on Special Interest Group on Data Communication, 2015, pp. 269-282.
Liu et al., "SmartLight: Light-weight 3D Indoor Localization Using a Single LED Lamp", Proceedings of the 15th ACM Conference on Embedded Network Sensor Systems, 2017, 14 pages.
Lymberopoulos et al., "A Realistic Evaluation and Comparison of Indoor Location Technologies: Experiences and Lessons Learned", Proceedings of the 14th International Conference on Information Processing in Sensor Networks, 2015, pp. 178-189.
Mariakakis et al., "SAIL: Single Access Point-based Indoor Localization", Proceedings of the 12th annual international conference on Mobile systems, applications, and services, 2014, 14 pages.
Monica Alleven, "Verizon applauds FCC chairman's move to 5G spectrum", available online at <https://www.fiercewireless.com/tech/verizon-applauds-fcc-chairman-s-move-to-5g-spectrum>, Oct. 5, 2015, 4 pages.
Nitsche et al., "Steering with Eyes Closed: mm-Wave Beam Steering without In-Band Measurement", IEEE Conference on Computer Communications (INFOCOM), 2015, pp. 2416-2424.
Olivier et al., "Lightweight Indoor Localization for 60-GHz Millimeter Wave Systems", 13th Annual IEEE International Conference on Sensing, Communication, and Networking (SECON), 2016, 9 pages.
Palacios et al., "JADE: Zero-Knowledge Device Localization and Environment Mapping for Millimeter Wave Systems", IEEE Conference on Computer Communications, 2017, 9 pages.
Peter F. M. Smulders, "Statistical Characterization of 60-GHz Indoor Radio Channels", IEEE Transactions on Antennas and Propagation, vol. 57, Issue 10, Oct. 2009, pp. 2820-2829.
R. C. Hansen, "Phased Array Antennas", John Wiley & Sons, Inc., 2009, 16 pages.
Ralph O. Schmidt., "Multiple Emitter Location and Signal Parameter Estimation", IEEE Transactions on Antennas and Propagation, vol. 34, Issue 3, Mar. 1986.
Rappaport et al., "Broadband Millimeter-Wave Propagation Measurements and Models Using Adaptive-Beam Antennas for Outdoor Urban Cellular Communications", IEEE Transactions on Antennas and Propagation, vol. 61, Issue 4, Apr. 2013, pp. 1850-1859.
Rappaport et al., 2014, "Millimeter Wave Wireless Communications", Prentice Hall, 80 pages.
Rasekh et al., "Noncoherent mmWave Path Tracking", Proceedings of the 18th International Workshop on Mobile Computing Systems and Applications, 2017, 6 pages.
Sen et al., "Avoiding Multipath to Revive Inbuilding WiFi Localization", Proceeding of the 11th annual international conference on Mobile systems, applications, and services, 2013, 14 pages.
Sen et al., "Bringing CUPID Indoor Positioning System to Practice", Proceedings of the 24th International Conference on World Wide Web, 2015, pp. 938-948.
Shahmansoori et al., "5G Position and Orientation Estimation through Millimeter Wave MIMO", In IEEE Globecom Workshops, 2015, 7 pages.
Steinmetzer et al., "Compressive Millimeter-Wave Sector Selection in Off-the-Shelf IEEE 802.11ad Devices", Proceedings of the 13th International Conference on emerging Networking EXperiments and Technologies, 2017, 12 pages.
Sur et al., "60 GHz Indoor Networking through Flexible Beams: A Link-Level Profiling", Proceedings of the ACM SIGMETRICS International Conference on Measurement and Modeling of Computer Systems, 2015, 14 pages.

(56) References Cited

OTHER PUBLICATIONS

Sur et al., "WiFi-Assisted 60 GHz Wireless Networks", Proceedings of the 23rd Annual International Conference on Mobile Computing and Networking, 2017, 14 pages.

Vasisht et al., "Decimeter-Level Localization with a Single WiFi Access Point", In Proceedings of the 13th Usenix Conference on Networked Systems Design and Implementation, 2016, pp. 165-178.

Wang et al., "Beamforming Codebook Design and Performance Evaluation for 60GHz Wideband WPANs", IEEE Journal on Selected Areas in Communications, vol. 27, No. 8, Oct. 2009, pp. 1390-1400.

Wei et al., "Facilitating Robust 60 GHz Network Deployment by Sensing Ambient Reflectors", Proceedings of the 14th USENIX Conference on Networked Systems Design and Implementation, 2017, pp. 213-226.

Wei et al., "mTrack: High-Precision Passive Tracking Using Millimeter Wave Radios", Proceedings of the 21st Annual International Conference on Mobile Computing and Networking, 2015, pp. 117-129.

Wei et al., "Pose Information Assisted 60 GHz Networks: Towards Seamless Coverage and Mobility Support", Proceedings of the 23rd Annual International Conference on Mobile Computing and Networking, 2017, 14 pages.

Xuerong et al., "Vehicle Positioning Using 5G Millimeter-Wave Systems", IEEE Access vol. 4, 2016, pp. 6964-6973.

Yun et al., "Strata: Fine-Grained Acoustic-based Device-Free Tracking", Proceedings of the 15th Annual International Conference on Mobile Systems, Applications, and Services, 2017, pp. 15-28.

Zhang et al., "OpenMili: A 60 GHz Software Radio Platform with a Reconfigurable Phased-Array Antenna", Proceedings of the 22nd Annual International Conference on Mobile Computing and Networking, 2016, pp. 162-175.

Zhang et al., "Pulsar: Towards Ubiquitous Visible Light Localization", Proceedings of the 23rd Annual International Conference on Mobile Computing and Networking, 2017, 14 pages.

* cited by examiner

ACCURATE LOCALIZATION OF CLIENT DEVICES FOR WIRELESS ACCESS POINTS

BACKGROUND

In recent years, radio-frequency (RF) based localization systems have attracted a great deal of attention from industry. Many RF-based localization systems can be implemented using wireless access points (APs) without using additional costly infrastructure such as cameras and depth sensors. Such RF-based localization systems are useful for many applications, such as navigation in large buildings or stadiums, device-to-device localization to connect people in physical proximity, occupancy detection, virtual and augmented reality generation, and vehicle tracking. Unlike acoustic-based or visible light-based localization systems, RF-based localization systems typically do not require Line-Of-Sight (LOS) communication between APs and client devices and can work over relatively long distances.

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

Figure 1:
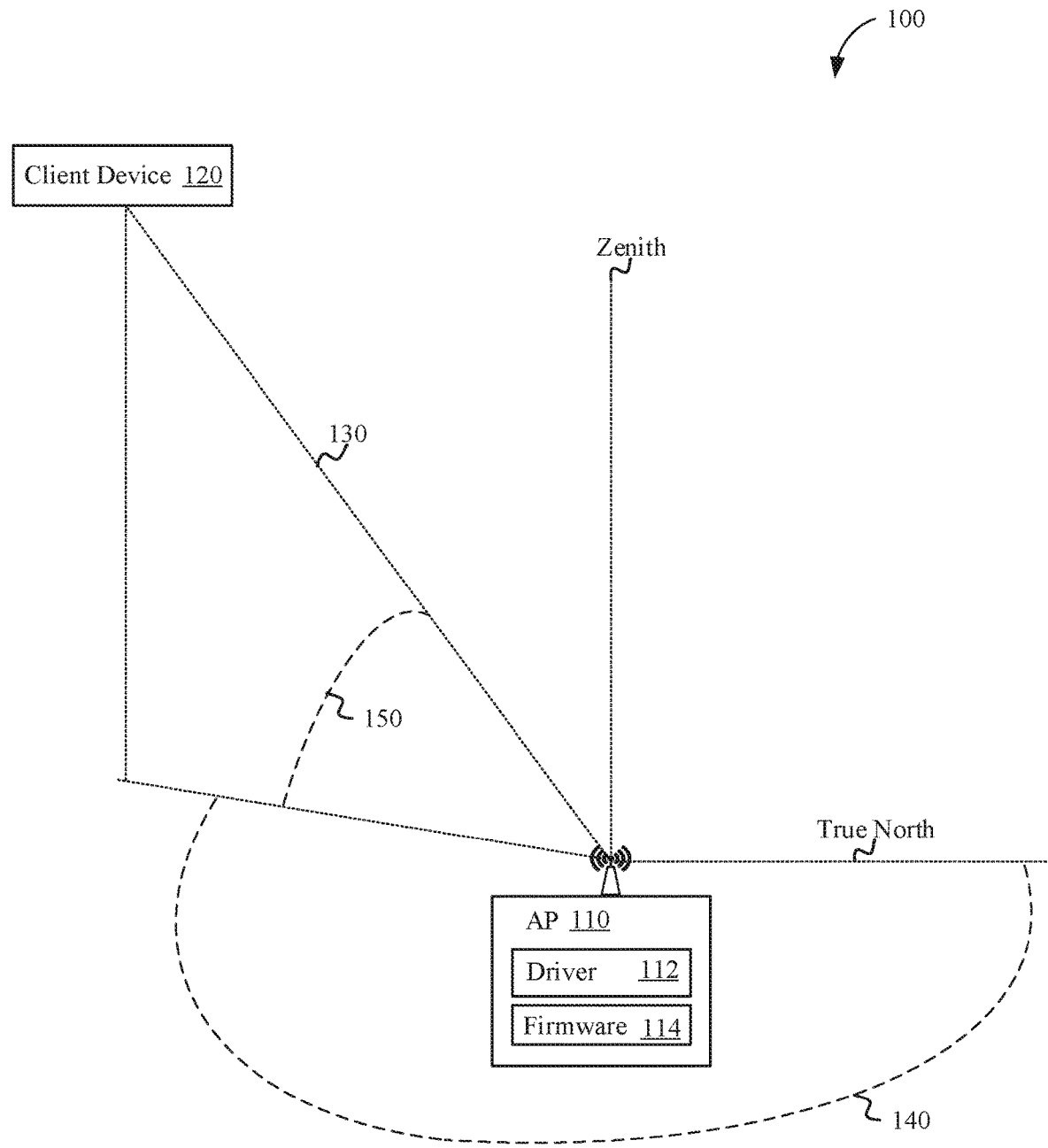
FIG. 1 illustrates an environment in which a mWaveloc system can be implemented, according to one example.

Despite the great potential that RF-based localization systems offer, extensive field trials have shown that existing RF-based localization systems still suffer from high error rates and other practical challenges. Specifically, recent studies reveal that the location-estimation error for existing RF-based localization systems can be up to several meters in realistic indoor scenarios. Moreover, existing RF-based localization systems often entail dense infrastructure deployment (e.g., of Wi-Fi APs or Bluetooth Low-Energy (BLE) beacons). Furthermore, existing RF-based localization systems often call for APs to operate on the same channel or to incorporate special antenna technology. These types of constraints impose high overheads in networks in which existing RF-based localization systems are implemented, thus limiting the practicality of such systems.

Recently, millimeter-wave (mmWave) wireless networks have become a notable technology for 5G mobile broadband connectivity, gigabit-speed wireless local-area network (WLAN) connectivity, and wireless backhaul connectivity. These mmWave networks enable new possibilities for device localization and tracking. Due to their high operational frequency (e.g., 60 gigahertz (GHz) for networks that conform to the Institute of Electrical and Electronics Engineers (IEEE) 802.11ad standard, which is hereby incorporated by reference) and their short wavelength (e.g., 5 millimeters (mm) for 802.11ad networks), mmWave wireless signals can help track a device's position at a very fine (e.g., millimeter-level) resolution.

However, in spite of the potential that mmWave networks have, state-of-art mmWave-based localization systems are still at a very early stage of development, adoption, and deployment for several reasons. First, mmWave-based localization systems often require specialized hardware, a priori knowledge of the physical environments in which they operate, and multiple APs to estimate a device's position. Also, the performance of such mmWave-based localization systems has been mainly evaluated through Software Defined Radios (SDRs) with horn antennas or through simulations; such evaluation approaches fail to consider the limitations of commodity mmWave hardware.

Some approaches to localization focus on Multiple-Input Multiple-Output (MIMO) mmWave wireless networks. Such approaches, which presume that mmWave devices are equipped with digital phased arrays, estimate the signal Angle-of-Arrival (AoA) using angular spectrum analysis. However, such approaches are not applicable to devices that conform to the IEEE 802.11ad standard because such devices are not MIMO-capable and only support analog phased arrays. Another approach is to emulate a digital phased array by collecting samples of the same signal using different weights (e.g., from a codebook) at an analog phased array receiver, isolating the signals on each antenna element, and applying various techniques to estimate the AoA and Angle-of-Departure (AoD) of each mmWave propagation path. However, in practice, the weight vectors of phased arrays are predefined and built into hardware for devices that comply with the 802.11ad standard. By contrast, systems described herein work with off-the-shelf devices that comply with the 802.11ad standard without requiring MIMO or any firmware modifications.

Another approach to localization is based on phase tracking. This approach involves tracking a device's trajectory by tracking signal phase shifts. However, channel measurements from off-the-shelf mmWave platforms are generally phase-incoherent due to the lack of carrier phase tracking across different packets. As a result, phase shifts up to 136° can occur even in scenarios where a device is not in motion.

Another approach to localization is based on non-coherent path tracking. This approach involves estimating the direction of the LOS path between a transmitter-receiver pair by correlating the radiation patterns with the Signal-to-Noise Ratios (SNRs) of a selected set of beams. However, this approach is highly inaccurate due to the imperfect beam patterns used by commodity devices that conform to the 802.11ad standard.

This disclosure presents a high-accuracy three-dimensional (3D) localization system that can be implemented using for commodity hardware (e.g., that conforms to the 802.11ad standard and operates in 60 GHz frequency range). The systems described herein leverage the existing 802.11ad network infrastructure, which is becoming increasingly popular for both indoor and outdoor connectivity. As a shorthand, the 3 d localization systems described herein will be referred to as "mWaveLoc systems."

While much of this disclosure discusses indoor applications, the mWaveLoc systems described herein can also be used for outdoor applications (e.g., vehicle positioning and tracking). Also, while much of this disclosure discusses how to implement the concepts disclosed herein in mmWave networks, many of the concepts disclosed herein can be implemented in other types of wireless networks (e.g., cellular networks) without departing from the spirit and scope of the disclosure.

The mWaveLoc system overcomes the constraints of existing systems in a number of ways. For example, the mWaveLoc system achieves a localization accuracy (decimeter level) than existing deployed RF-based systems (which typically provide meter-level accuracy). Furthermore, unlike existing WiFi systems that support 2D space localization, the mWaveLoc system can track a device's position in 3D space. This makes the mWaveloc system suitable for applications such as mobile robot navigation and position-dependent virtual reality (VR) or augmented reality (AR).

Also, unlike existing systems, the mWaveLoc system does not require a dense, centrally controlled wireless infrastructure. Instead, the mWaveLoc system can successfully identify the location of a client device using a single AP. This allows low-latency tracking that is useful for VR/AR applications as well as device-to-device location applications.

The mWaveLoc system can also provide accurate localization with a 60 GHz operational link even under conditions that challenge existing systems, such as when a device to be localized is moving or when environmental blockages obstruct signal paths. Unlike existing systems that focus on short range (3-4 meters) tracking, the mWaveLoc system can support longer range (e.g., greater than 20 meters) tracking.

Furthermore, unlike existing systems, the mWaveLoc system can be implemented off-the-shelf hardware that complied with the IEEE 802.11ad standard without requiring any specialized, expensive hardware. Also, the mWaveLoc system can be fully implemented at the AP side without requiring any changes to the client devices that are to be located.

To provide the advantages listed above (and other advantages), the mWaveLoc can leverage several properties of 60 GHz networks that comply with the IEEE 802.11ad standard. For example, mmWave devices use phased array antennas to focus RF energy through directional beams (i.e., beamforming), thereby compensating for the attenuation loss that occurs in high frequency (60 GHz) bands. When an AP is communicating with a wireless client device, the beams with relatively high signal strength are more likely to be aligned with the direction of the Line-of-Sight (LOS) wireless propagation path between the AP and the device. Through techniques described herein, the mWaveLoc system can use beams identified through the beamforming process to help find the direction of the LOS path and the position of the device.

Another feature of mmWave devices that the mWaveLoc system can leverage is the relatively short wavelength of communications. The granularity of an estimate of a distance between two devices is generally proportional to the carrier frequency (and hence to the wavelength) of wireless communications between the two devices. Since devices that comply with the 802.11ad standard operate 60 GHz (a 5 mm wavelength), the mWaveLoc system can leverage communications between the devices through techniques described herein to yield accurate, high-granularity estimates of the distance between two devices (e.g., an AP and a client device).

Empirical results suggest that the mWaveLoc system can be implemented in the kernel of a commodity 802.11ad AP platform without necessitating any modifications to any core functions described in the 802.11ad standard (e.g., beam selection, codebook design, etc.). In addition, empirical results suggest that the mWaveLoc system is effective in many different surroundings and scenarios involving pedestrians, blockages (e.g., buildings or other obstacles, and device motion), and distances ranging from 0.25 meters to 22 meters. In most of these scenarios, mWaveLoc systems achieves decimeter-level 3D localization accuracy (e.g., estimation error less than one meter) with a median estimation error of about 75 centimeters. Even when blockages, AP-client antenna misalignments, and long AP-client separation distances are present, mWaveLoc systems still typically achieve decimeter-level 3D localization accuracy in the majority of the cases. By contrast, existing systems (e.g., that apply non-coherent path tracking) achieve a median estimation error of about 2.7 meters.

FIG. 1 illustrates an environment 100 in which a mWaveloc system can be implemented, according to one example. As shown, the environment 100 includes a wireless access point (AP) 110 and a client device 120. A driver 112 and firmware 114 execute on the AP 110. The direction of an LOS path 130 between the AP 110 and the client device 120 can be quantified in spherical coordinates by an azimuth 140 and an elevation 150.

In this context, the azimuth 140 and the elevation 150 are angles used to define the position of the client device 120 relative to the AP 110. The azimuth 140 may be a compass bearing (relative to true north) of the client device 120 relative to the AP 110. In general, compass bearings are measured clockwise in degrees from true north. The elevation 150 of the client device can be defined as the angle between the azimuth and the LOS path 130.

The firmware 114 collects Channel Impulse Response (CIR) measurements (e.g., while performing a beam scan as described in the 802.11ad standard) for wireless communications exchanged between the AP 110 and the client device 120. The driver 112, which implements aspects of the mWavLoc system, sanitizes the CIR measurements for the directional beams supported by the AP 110 (e.g., available beams per the 802.11ad platform). Next, upon analyzing the CIR measurements (as described in greater details below with respect to FIG. 2), the driver 112 extracts the LOS path for each beam and excludes non-LOS (NLOS) paths from strong reflectors. Next, the driver 112 selects a subset of the beams that strongly amplify the LOS path. In one embodiment, the number of beams included in this high-LOS-amplitude subset is a predefined constant. The driver 112 correlates amplitudes of the beams included in the high-LOS-amplitude subset with the beam patterns of those beams (which are predefined at the AP 110) to identify a region in which the azimuth 140 and the elevation 150 of the LOS path 130 (and hence the client device 120) are likely located. Next, the driver 112 pinpoints the LOS path 130 toward the client device 120 within the region. (The process for identifying the region and estimating the LOS path 130 is described in greater detail below with respect to FIG. 2) Empirical results show that the LOS path 130 can be estimated very accurately despite the fact that many beams are imperfect (e.g., many beams include strong side lobes) in commodity 802.11ad devices.

The driver 112 is also configured to determine the distance between the AP 110 and the client device 120 in the direction of the LOS path 130. The firmware 114 performs a Fine Timing Measurement (FTM) protocol (e.g., as described in the 802.11ad standard), thereby gathering Time-of-Arrival (ToA) and Time-of-Departure (ToD) measurements for frames sent between the AP 110 and the client device 120. The driver 112 creates a refined set of ToA and ToD measurements by excluding ToA and ToD measurements for frames that were sent using beams for which at least one NLOS path had a higher amplitude than the LOS path. Using this refined set of ToA and ToD measurements, the driver 112 determines the measure the Time of Fight (ToF), which is the round-trip propagation time for signals transmitted between the AP 110 and the client device 120. Using the ToF, the driver 112 estimates the distance between the AP 110 and the client device 120. Unlike existing systems that estimate distances via erroneous phase-shift tracking, the driver 112 estimates the distance using techniques that are robust to phase incoherence that is often observed in commodity 802.11ad platforms.

Figure 2:
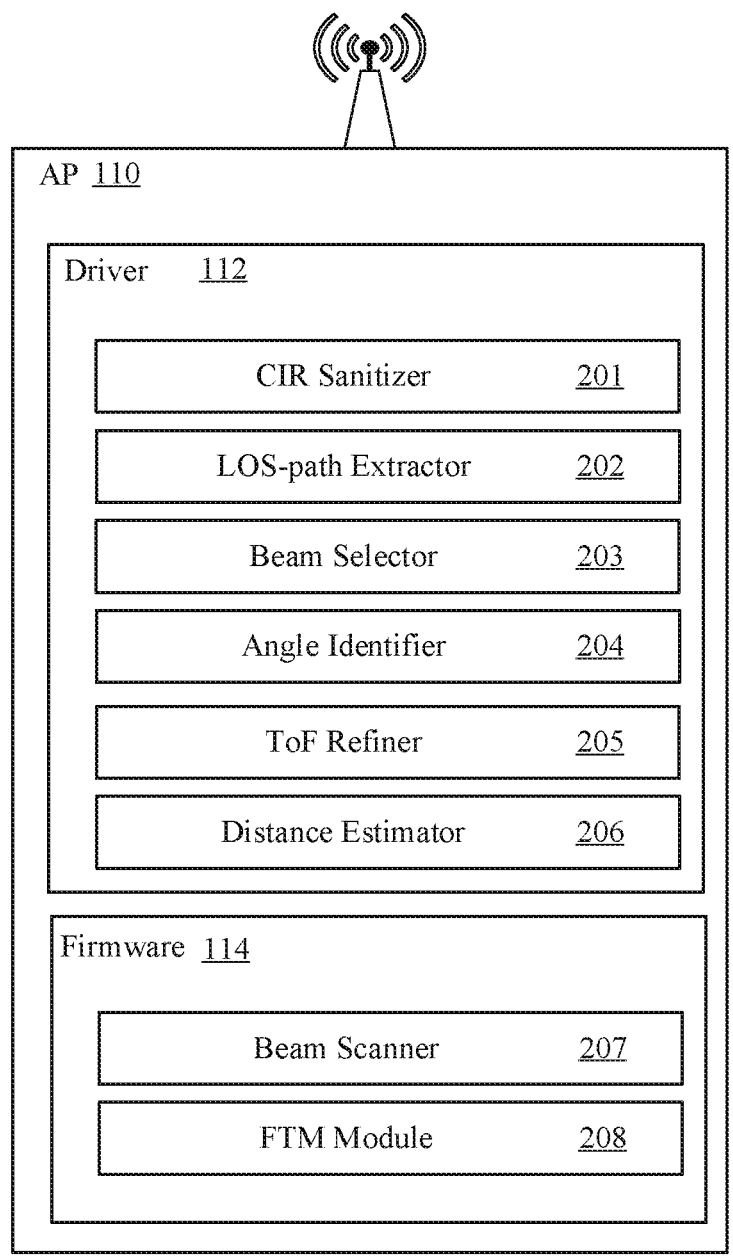
FIG. 2 illustrates a detailed view of an access AP, a driver, and firmware, according to one embodiment.

FIG. 2 illustrates a detailed view of the AP 110, the driver 112, and the firmware 114, according to one embodiment. As shown, the driver 112 comprises a CIR sanitizer 201, an LOS-path extractor 202, a beam selector 203, an angle identifier 204, a ToF refiner 205, and a distance estimator 206. The firmware 114 comprises a beam scanner 207 and a Fine Timing Measurement (FTM) module 208.

When the AP 110 establishes a wireless communication link with the client device 120, the beam scanner 207 applies a beamforming training (BFT) process to discover the transmit (Tx) and receive (Rx) beams that currently have the highest signal strength between the AP 110 and the client device 120. For example, if the beam scanner 207 applies the BFT process described in the IEEE 802.11ad standard, the beam scanner 207 performs a Sector Level Sweep (SLS) phase and, optionally, a Beam Refinement Phase (BRP). During the BFT process, the beam scanner 207 collects Channel Impulse Response (CIR) feedback (e.g., measurements) for each available beam.

To estimate the LOS path 130, the driver 112 can leverage two specific properties of mmWave channels: channel sparsity and beam-independent path extraction. In practice, an mmWave channel is often sparse (e.g., containing 1-3 dominating wireless signal propagation paths). The number of propagation paths and the signal amplitudes of those propagation paths can be extracted by using the CIR feedback to identify the LOS path 130 and the beams that align the most with the path. While changing beam patterns at a transmitter (e.g., the AP 110) leads to different CIR measurements at a receiver (e.g., the client device 120), the underlying signal paths traversed by the different beams is the same. Typically, the amplitudes of CIR measurements for beams whose radiation patterns overlap more favorably with those signal propagation paths will be higher than the amplitudes for beams whose radiation patterns focus in other directions.

Based on these properties, the driver 112 can detect the composition of the multipath environment (i.e., the signal propagation paths) and use this information to extract the LOS path 130 between the AP 110 and the client device 120. Specifically, the driver 112 can identify a subset of M beams (where M is a positive integer that is less than the total number of available beams) that align more favorably with the LOS path 130. By correlating the LOS-path CIR amplitudes for the M beams with their beam patterns for the M beams (e.g., as described below), the driver 112 can estimate the direction of the LOS path 130.

The mmWave signals from the AP 110 to the client device 120 arrive along S distinct paths (where S is a positive integer). Each individual path included in the S distinct paths is described by that individual path's amplitude $a_s$, phase $\varnothing_s$, azimuth $\theta_s^{az}$, and elevation $\theta_s^{el}$, where $s=1, 2, \ldots, S$. The direction of a path can be represented by the pair $(\theta_s^{az}, \theta_s^{el})$. The driver 112 is configured to extract the amplitude and angular information for the LOS path 130, which can collectively be represented by the 3-tuple $(a_s, \theta_s^{az}, \theta_s^{el})$. To this end, the driver 112 uses the CIR measurements for each beam to measure the amplitude of the different wireless propagation paths (e.g., both direct and reflected) for that beam. If the AP 110 and the client device 120 comply with the 802.11ad standard, the driver 112 can measure potential paths with an arrival time difference of 0.57 nanoseconds.

However, before the driver 112 proceeds to path extraction, the CIR sanitizer 201 separates dominating path signals (which appear as high-amplitude local maxima) from weak reflected signals or noises (which appear as low-amplitude local maxima) in the Power Delay Profile (PDP) of a beam (e.g., a plot of the CIR measurements for the beam against time). The CIR sanitizer 201 identifies the dominating paths by identifying the local maxima whose amplitudes are smaller than the highest-amplitude local maxima $\alpha_{peak}$ of the PDP by less than a predefined threshold. Specifically, if $\alpha(t)$ is the amplitude at time t a sanitizer function $\alpha'(t)$ can be formally defined as:

$$\alpha'(t) = \begin{cases} \alpha(t) & \text{if } [\alpha(t) > \alpha(t-1)] \cap [\alpha(t) > \alpha(t+1)] \cap [\alpha(t) > \alpha_{peak} - A_{tr}] \\ 0 & \text{otherwise} \end{cases},$$

where $A_{tr}$ is the threshold amount. The sanitizer function has the effect of flattening regions of the PDP that differ from $\alpha_{peak}$ by more than $A_{tr}$, thereby leaving only local maxima that represent dominating signal paths. Empirical results suggest that setting $A_{tr}$ to five decibels (dB) typically leads to successful identification of the dominating signal paths.

Once sanitization is complete, the LOS-path extractor 202 can identify the local maxima that correspond to the LOS path 130 for each of the available beams. In general, the first local maximum to occur in a sanitized PDP corresponds to the LOS path 130 because reflected signals that arrive via reflected paths travel longer distances (and therefore show up as local maxima that are later in time than the local maximum that corresponds to the LOS path 130.) Although signals that arrive via the LOS path 130 travel a shorter distance, the local maximum that corresponds to the LOS path 130 may have a lower amplitude than a local maximum that corresponds to a reflected path if the directional radiation pattern of the beam under consideration does not align well with the LOS path 130.

Although phase can be incoherent between back-to-back samples in devices that conform to the 802.11ad standard, empirical results show that this approach to path extraction is robust to such deviations.

Once the LOS-path extractor 202 has identified the local maxima that correspond to the LOS path 130 for each of the available beams, the beam selector 203 identifies a high-LOS-amplitude subset of the beams (i.e., the M beams with higher LOS-path amplitudes than the remainder of the N available beams, where N is a positive integer and N>M). Note that, in some cases, some of the M beams may not be the have higher SNRs than the remainder of the N available beams because the LOS path extractor 202 ignores the local maxima that correspond to strong reflected paths.

Next, the angle identifier 204 can identify the azimuth and elevation of the LOS path 130, which can be referred to as $(\hat{\theta}^{az}, \hat{\theta}^{el})$, in the following manner. Specifically, for each direction $(\theta^{az}, \theta^{el})$ in a plurality of possible directions, the angle identifier 204 can calculate a respective aggregate beam gain $G_a(\theta^{az}, \theta_{el})$ according to the following equation:

$$G_a(\theta^{az}, \theta^{el}) = \sum_{m \in M} \frac{A_m(\theta^{az}, \theta^{el})}{\max_{\forall m \in M, \forall \theta \in \Theta} \{A_m(\theta^{az}, \theta^{el})\}} \cdot \alpha_{los}^m,$$

where M refers to the M beams in the high-LOS-amplitude subset, Θ refers to the set of angles that make up the directions being considered (e.g., from 0 degrees to 360 degrees in increments of 1), $A_m(\theta^{az}, \theta^{el})$ refers to the gain of beam m, and $\alpha_{los}^m$ refers to the amplitude of the LOS path 130 for beam m.

Once the aggregate beam gains are calculated, the angle identifier 204 could simply use the direction with the highest aggregate gain as an estimate for the direction of the LOS path 130. However, empirical results suggest that the following approach is more effective.

First, the angle identifier 204 identifies a high-gain subset of the directions. The high-gain subset includes R of the directions, where R is a positive integer that is less than the total number of directions for which aggregate gains were calculated. The aggregate gains for the directions included in the high-gain subset are greater than the aggregate gains for the directions that are not included in the high-gain subset.

Next, the angle identifier 204 determines an azimuth upper limit, and azimuth lower limit, an elevation upper limit, and an elevation lower limit for the directions included in the high-gain subset. The angle identifier 204 determines the centroid of a graphical region (e.g., in a Cartesian graph where one axis denotes azimuth values and another axis represents elevation values) bounded by the azimuth upper limit, the azimuth lower limit, the elevation upper limit, and the elevation lower limit. The angle identifier 204 selects the direction specified by the azimuth elevation coordinates of the centroid as the estimate for the direction of the LOS path 130.

The driver 112 is also configured to estimate the distance between the AP 110 and the client device 120. The FTM module 208 gathers ToA and ToD measurements for radio frames sent between the AP 110 and the client device 120. In some embodiments, the driver 112 can estimate the ToF (the round-trip propagation time for signals transmitted between the AP 110 and the client device 120) based on the FTM protocol provided in the 802.11ad standard without taking any additional actions. However, empirical results that the driver 112 can estimate the ToF more accurately by performing the following actions.

First, the ToF refiner 205 identifies an exclusion subset of the beams. For each individual beam in the exclusion subset, the respective amplitude of the LOS path 130 (i.e., the local maximum corresponding to the LOS path 130) for the individual beam is less than the highest local maximum for the individual beam (which corresponds to a reflected path).

Once the exclusion subset has been identified, the ToF refiner 205 creates a refined set of ToA and ToD measurements by excluding ToA and ToD measurements for frames that were sent from the AP 110 to the client device 120 using beams included in the exclusion subset.

Next, the ToF refiner 205 estimates the ToF using the only the ToA and ToD measurements found in the refined set (e.g., by applying the FTM scheme described in the 802.11ad standard to the refined set). The distance estimator 206 then estimates the distance between the AP 110 and the client device 120 using the ToF as estimated (e.g., by applying methods described in the 802.11ad standard).

Figure 3:
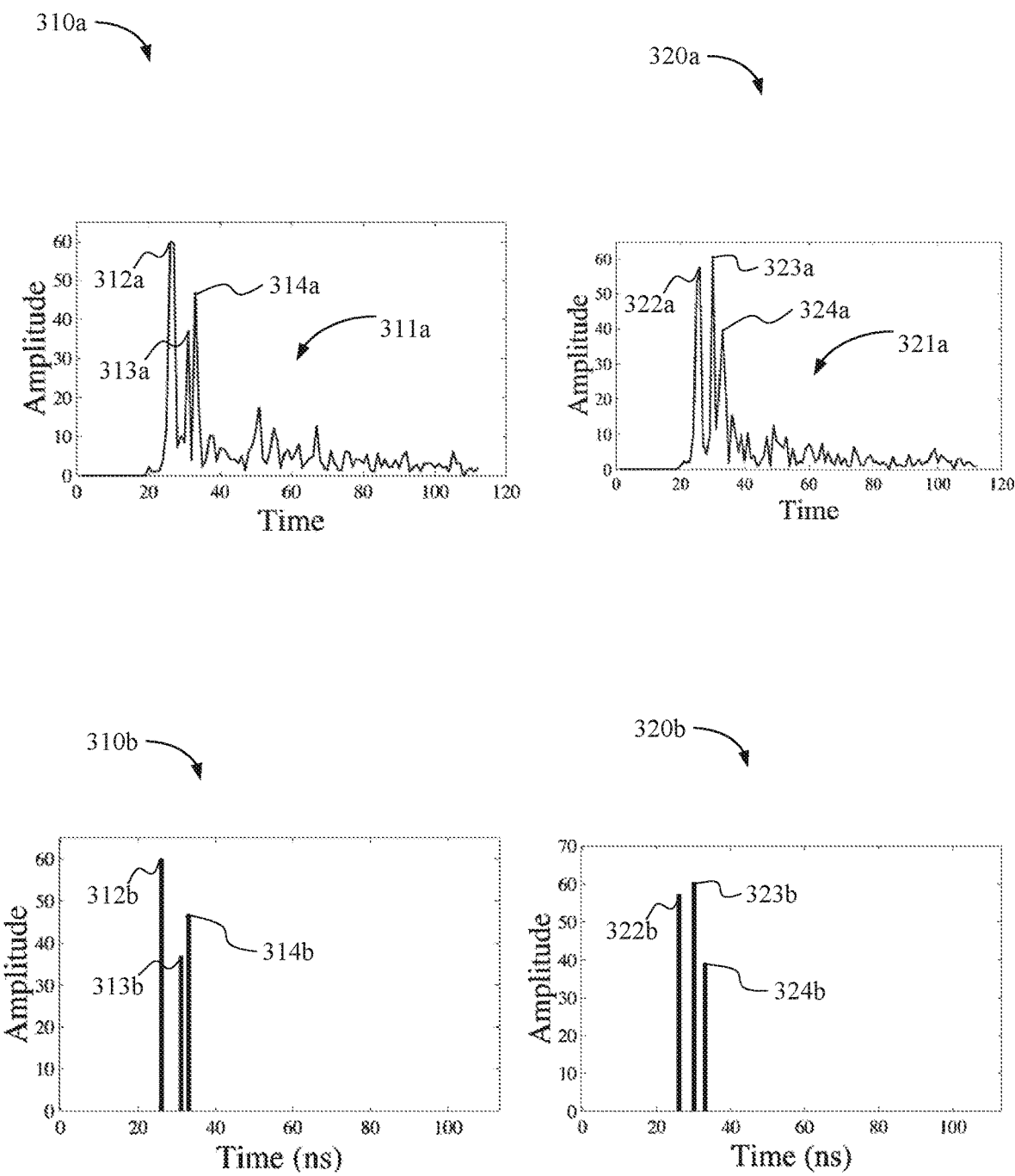
FIG. 3 provides example plots of PDPs of directional beams to illustrate some of the concepts discussed herein, according to one example.

FIG. 3 provides example plots of PDPs of directional beams to illustrate some of the concepts discussed above, according to one example. Persons of skill in the art will understand that the PDPs for beams in other use cases may differ (e.g., in terms of the number of local maxima, the timing at which the local maxima occur, the amplitude levels, the amount of noise, etc.).

Plot 310a shows a curve 311a for a first beam as determined by CIR measurements for the first beam. As shown, the curve 311a includes local maximum 312a, local maximum 313a, and local maximum 314a (which is the highest local maximum for curve 311a). Curve 311a also includes other local maxima that represent noise.

Similarly, plot 320a shows a curve 321a for a second beam as determined by CIR measurements for the second beam. As shown, the curve 321a includes local maximum 322a, local maximum 323a (which is the highest local maximum for curve 320a), and local maximum 324a. Curve 321a also includes other local maxima that represent noise.

Graph 310b shows the data that result when the CIR measurements depicted by the curve 311a in plot 310a are sanitized. Bar 312b corresponds to the local maximum 312a, while bar 313b corresponds to local maximum 313a and bar 314b corresponds to local maximum 314a. The sanitization process removed local maxima that correspond to noise, so bar 312b, bar 313b, and bar 314b each represent the amplitude of a distinct signal path for the first beam, respectively. Since bar 312b is first in time, the height of bar 312b represents the amplitude of the LOS path. Since bar 313b and bar 314b have lower heights than bar 312b, the LOS path has the highest amplitude of any of the signal paths for the first beam during the time period depicted on graph 310b. Thus, the radiation pattern of the first beam aligns well with the LOS path.

Similarly, graph 320b shows the data that result when the CIR measurements depicted by the curve 321a in plot 320a are sanitized. Bar 322b corresponds to the local maximum 322a, while bar 323b corresponds to local maximum 323a and bar 324b corresponds to local maximum 324a. The sanitization process removed local maxima that correspond to noise, so bar 322b, bar 323b, and bar 324b each represent the amplitude of a distinct signal path for the second beam, respectively. Since bar 322b is first in time, the height of bar 322b represents the amplitude of the LOS path. However, although the amplitude of the LOS path is relatively high, bar 323b has a greater height than bar 322b or bar 324b. This means that the NLOS path corresponding to bar 323b has the highest amplitude of any of the signal paths for the second beam during the time period depicted on graph 320b. Thus, the radiation pattern of the second beam aligns reasonably well with the LOS path, but an NLOS (e.g., reflected) path still yields a higher amplitude.

Figure 4:
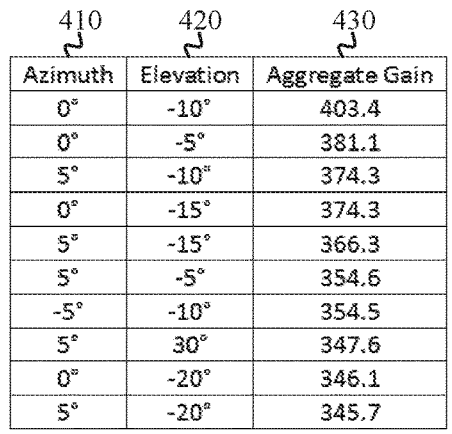
FIG. 4 illustrates an example table of aggregate gain values for directions and a resulting region for which a centroid indicates an estimated direction of an LOS path, according to one example.
Figure 4:
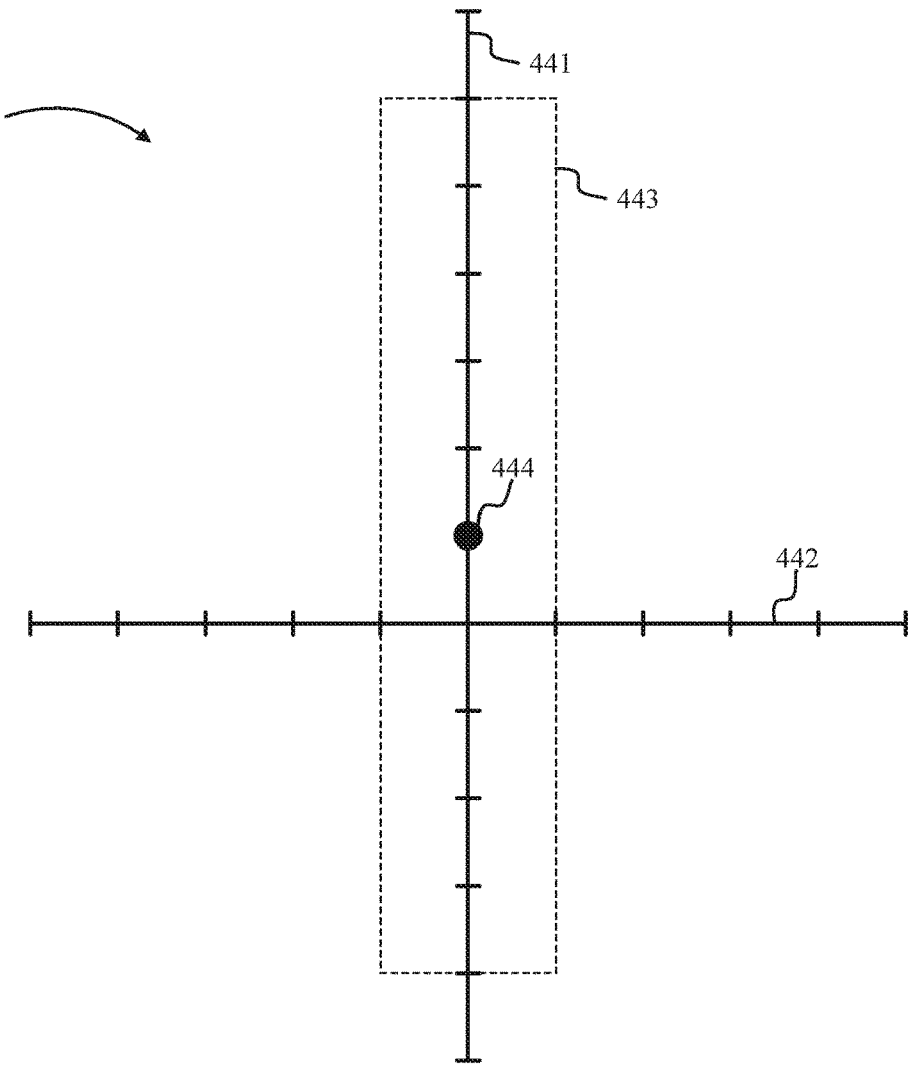

FIG. 4 illustrates an example table 401 of aggregate gain values for directions and a resulting region 443 for which a centroid 444 indicates an estimated direction of an LOS path, according to one example.

The table 401 includes ten entries total. Thus, in this example, the value of R (i.e., the cardinality of the high-gain subset) is ten. However, persons of skill in the art will understand that the value of R may vary in other examples.

In the table 401, column 410 specifies the azimuth values for the directions included a high-gain subset, column 420 specifies the elevation values for the directions in the high-gain subset, and column 430 specifies the aggregate gain for the directions included in the high-gain subset. As shown, the highest azimuth value that occurs in column 410 is 5 degrees. For this reason, the azimuth upper limit for the directions in the high-gain subset in this example is 5 degrees. The lowest azimuth value that occurs in column 410 is −5 degrees, so the azimuth lower limit for the directions in the high-gain subset in this example is −5 degrees. Similarly, the highest elevation value that occurs in column 420 is 30 degrees, so the elevation upper limit for the directions in the high-gain subset in this example is 30 degrees. The lowest elevation value that occurs in column 420 is −20 degrees, so the elevation lower limit for the directions in the high-gain subset in this example is −20 degrees. (Persons of skill in the art will recognize that the upper and lower limits of the azimuth and elevation may vary in other examples.)

Graph 440 includes an elevation axis 441 and an azimuth axis 442. As shown, region 443 is bounded by the azimuth upper limit, the azimuth lower limit, the elevation upper limit, and the elevation lower limit. Hence, in this example, the coordinates of the centroid 444 would be selected as an estimate of the LOS path.

Figure 5:
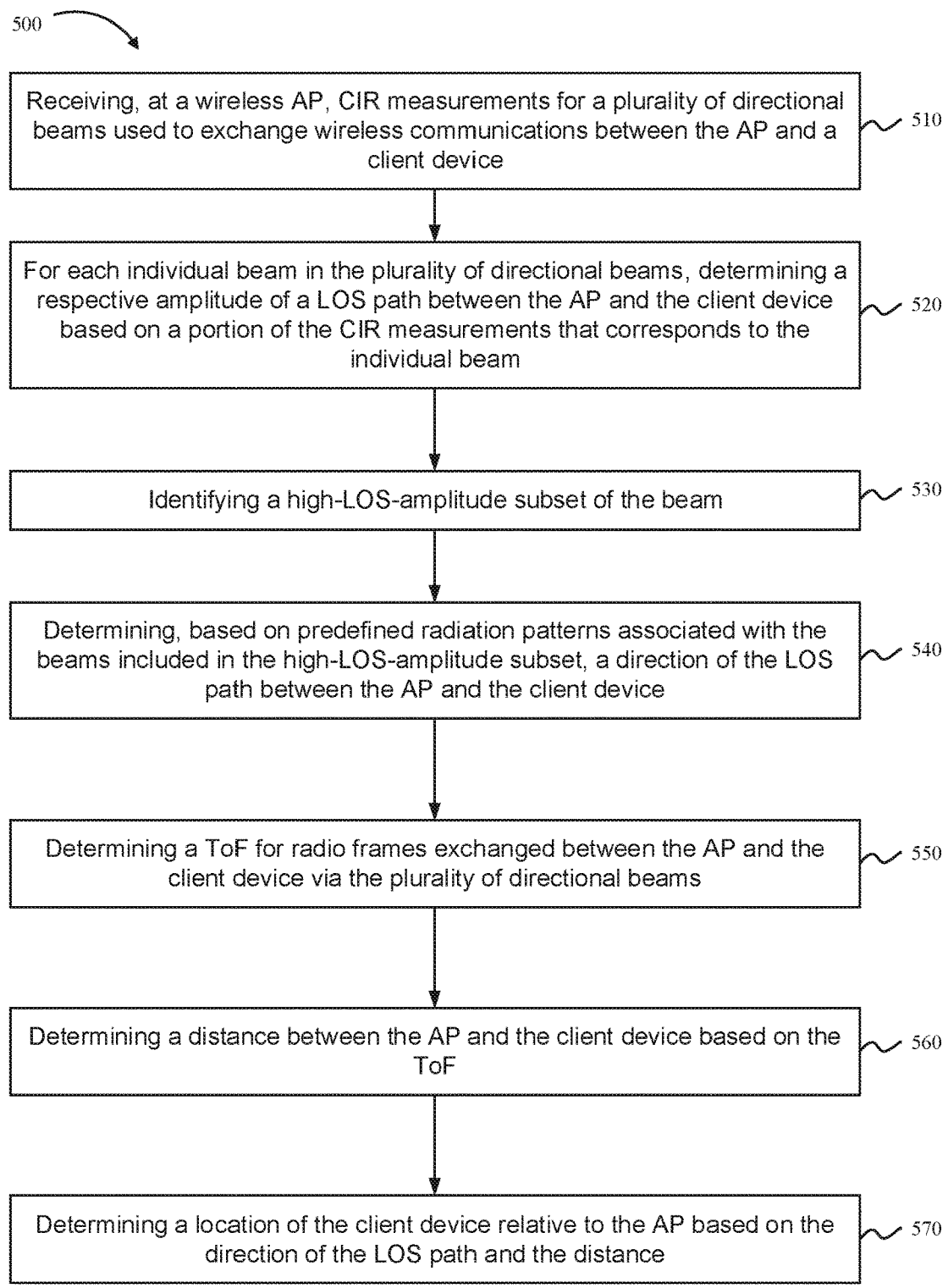
FIG. 5 illustrates functionality for an AP as described herein, according to one example

FIG. 5 illustrates functionality 500 for an AP as described herein, according to one example. The functionality 500 may be implemented as a method or can be executed as instructions on a machine (e.g., by one or more processors), where the instructions are included on at least one computer-readable storage medium (e.g., a transitory or non-transitory computer-readable storage medium). While only seven blocks are shown in the functionality 500, the functionality 500 may include other actions described herein. Also, some of the blocks shown in the functionality 500 may be omitted without departing from the spirit and scope of this disclosure.

As shown in block 510, the functionality 500 includes receiving, at a wireless AP, CIR measurements for a plurality of directional beams used to exchange wireless communications between the AP and a client device. In some examples, the AP complies with the IEEE 802.11ad standard.

As shown in block 520, the functionality 500 includes, for each individual beam in the plurality of directional beams, determining a respective amplitude of a LOS path between the AP and the client device based on a portion of the CIR measurements that corresponds to the individual beam.

In some examples, determining the respective amplitude of the LOS path may comprise: identifying a plurality of local maxima in a Power Delay Profile (PDP) for the individual beam; identifying, from among the local maxima in the PDP, a highest local maximum for the individual beam; and sanitizing the PDP by flattening any of the local maxima that are more than a threshold amount less than the highest local maximum, wherein a remaining local maximum that is first in time in the PDP after the sanitizing represents the respective amplitude of the LOS path. The threshold amount may be, for example, about five decibels.

Also, determining the ToF may comprise: receiving Time-of-Arrival (ToA) and Time-of-Departure (ToD) measurements for the radio frames; identifying an exclusion subset within the plurality of beams, wherein, for each individual beam in the exclusion subset, the respective amplitude of the LOS path for the individual beam is less than the highest local maximum for the individual beam; creating a refined set of ToA and ToD measurements by excluding ToA and ToD measurements for frames that were sent from the AP to the client device using beams included in the exclusion subset; and determining the ToF based on the refined set of ToA and ToD measurements.

As shown in block 530, the functionality 500 includes identifying a high-LOS-amplitude subset of the beams. The respective amplitudes of the LOS path for the beams included in the high-LOS-amplitude subset are greater than the respective amplitudes of the LOS path for the beams that are not included in the high-LOS-amplitude subset. In some examples, the cardinality of the high-LOS-amplitude subset is predefined. Also, in some examples, the AP operates in a millimeter-wave (mmWave) spectrum.

As shown in block 540, the functionality 500 includes determining, based on predefined radiation patterns associated with the beams included in the high-LOS-amplitude subset, a direction of the LOS path between the AP and the client device.

In some examples, determining the direction of the LOS path may comprise: for each individual direction in a plurality of directions: for each individual beam in the high-LOS-amplitude subset, calculating a respective gain of the individual beam for the individual direction; and determining an aggregate gain for the individual direction based on the respective gains of the beams in the high-LOS-amplitude subset for the individual direction.

In some examples, determining the aggregate gain for the individual direction may comprise: for each individual beam in the high-LOS-amplitude subset: determining a quotient by dividing the respective gain of the individual beam for the individual direction by a highest respective gain of any of the beams in the high-LOS-amplitude subset for the individual direction; determining a product by multiplying the quotient by the respective amplitude of the LOS path for the individual beam; and adding the product to a sum that represents the aggregate gain for the individual direction.

Also, in some examples, determining the direction of the LOS path may further comprise: identifying a high-gain subset of the directions, wherein the aggregate gains for the directions included in the high-gain subset are greater than the aggregate gains for the directions that are not included in the high-gain subset; determining an azimuth upper limit of the directions included in the high-gain subset; determining an azimuth lower limit of the directions included in the high-gain subset; determining an elevation upper limit of the directions included in the high-gain subset; determining an elevation lower limit of the directions included in the high-gain subset; and determining a centroid of a graphical region bounded by the azimuth upper limit, the azimuth lower limit, the elevation upper limit, and the elevation lower limit, wherein the direction of the LOS path is represented by an azimuth coordinate of the centroid and an elevation coordinate of the centroid.

As shown in block 550, the functionality 500 includes determining a ToF for radio frames exchanged between the AP and the client device via the plurality of directional beams.

As shown in block 560, the functionality 500 includes determining a distance between the AP and the client device based on the ToF.

As shown in block 570, the functionality 500 includes determining a location of the client device relative to the AP based on the direction of the LOS path and the distance.

In some examples, the functionality 500 may also include sending a wireless communication to the client device from the AP to indicate the location of the client device.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

What is claimed is:

1. A system comprising:
one or more processors; and
a memory storing instructions that, when executed on the one or more processors, perform a set of actions comprising:
receiving, at a wireless access point (AP), Channel Impulse Response (CIR) measurements for a plurality of directional beams used to exchange wireless communications between the AP and a client device;
for each individual beam in the plurality of directional beams, determining a respective amplitude of a Line-of-Sight (LOS) path between the AP and the client device based on a portion of the CIR measurements that corresponds to the individual beam by:
identifying a plurality of local maxima in a Power Delay Profile (PDP) for the individual beam;
identifying, from among the local maxima in the PDP, a highest local maximum for the individual beam; and
sanitizing the PDP by flattening any of the local maxima that are more than a threshold amount less than the highest local maximum, wherein a remaining local maximum that is first in time in the PDP after the sanitizing represents the respective amplitude of the LOS path;
identifying a high-LOS-amplitude subset of the beams, wherein the respective amplitudes of the LOS path for the beams included in the high-LOS-amplitude subset are greater than the respective amplitudes of the LOS path for the beams that are not included in the high-LOS-amplitude subset;
determining, based on predefined radiation patterns associated with the beams included in the high-LOS-amplitude subset, a direction of the LOS path between the AP and the client device;
determining a Time-of-Flight (ToF) for radio frames exchanged between the AP and the client device via the plurality of directional beams;
determining a distance between the AP and the client device based on the ToF; and
determining a location of the client device relative to the AP based on the direction of the LOS path and the distance.

2. The system of claim 1, wherein determining the direction of the LOS path comprises:
for each individual direction in a plurality of directions:
for each individual beam in the high-LOS-amplitude subset, calculating a respective gain of the individual beam for the individual direction; and
determining an aggregate gain for the individual direction based on the respective gains of the beams in the high-LOS-amplitude subset for the individual direction.

3. The system of claim 2, wherein determining the aggregate gain for the individual direction comprises:
for each individual beam in the high-LOS-amplitude subset:
determining a quotient by dividing the respective gain of the individual beam for the individual direction by a highest respective gain of any of the beams in the high-LOS-amplitude subset for the individual direction;
determining a product by multiplying the quotient by the respective amplitude of the LOS path for the individual beam; and
adding the product to a sum that represents the aggregate gain for the individual direction.

4. The system of claim 3, wherein determining the direction of the LOS path further comprises:
identifying a high-gain subset of the directions, wherein the aggregate gains for the directions included in the high-gain subset are greater than the aggregate gains for the directions that are not included in the high-gain subset;
determining an azimuth upper limit of the directions included in the high-gain subset;
determining an azimuth lower limit of the directions included in the high-gain subset;
determining an elevation upper limit of the directions included in the high-gain subset;
determining an elevation lower limit of the directions included in the high-gain subset; and
determining a centroid of a graphical region bounded by the azimuth upper limit, the azimuth lower limit, the elevation upper limit, and the elevation lower limit, wherein the direction of the LOS path is represented by an azimuth coordinate of the centroid and an elevation coordinate of the centroid.

5. The system of claim 1, wherein determining the ToF comprises:
receiving Time-of-Arrival (ToA) and Time-of-Departure (ToD) measurements for the radio frames;
identifying an exclusion subset within the plurality of beams, wherein, for each individual beam in the exclusion subset, the respective amplitude of the LOS path for the individual beam is less than the highest local maximum for the individual beam;
creating a refined set of ToA and ToD measurements by excluding ToA and ToD measurements for frames that were sent from the AP to the client device using beams included in the exclusion subset; and
determining the ToF based on the refined set of ToA and ToD measurements.

6. The system of claim 1, wherein the threshold amount is about five decibels (dB).

7. The system of claim 1, wherein a cardinality of the high-LOS-amplitude subset is predefined.

8. The system of claim 1, wherein the AP operates in a millimeter-wave (mmWave) spectrum.

9. The system of claim 1, wherein the set of actions further comprises:
sending a wireless communication to the client device from the AP to indicate the location of the client device.

10. The system of claim 1, wherein the AP is complies with an Institute of Electrical and Electronics Engineers (IEEE) 802.11ad standard.

11. A method comprising:
receiving, at a wireless access point (AP), Channel Impulse Response (CIR) measurements for a plurality of directional beams used to exchange wireless communications between the AP and a client device;
for each individual beam in the plurality of directional beams, determining a respective amplitude of a Line-of-Sight (LOS) path between the AP and the client device based on a portion of the CIR measurements that corresponds to the individual beam by:
identifying a plurality of local maxima in a Power Delay Profile (PDP) for the individual beam;
identifying, from among the local maxima in the PDP, a highest local maximum for the individual beam; and sanitizing the PDP by flattening any of the local maxima that are more than a threshold amount less than the highest local maximum, wherein a remaining local maximum that is first in time in the PDP after the sanitizing represents the respective amplitude of the LOS path;

identifying a high-LOS-amplitude subset of the beams, wherein the respective amplitudes of the LOS path for the beams included in the high-LOS-amplitude subset are greater than the respective amplitudes of the LOS path for the beams that are not included in the high-LOS-amplitude subset;

determining, based on predefined radiation patterns associated with the beams included in the high-LOS-amplitude subset, a direction of the LOS path between the AP and the client device;

determining a Time-of-Flight (ToF) for radio frames exchanged between the AP and the client device via the plurality of directional beams;

determining a distance between the AP and the client device based on the ToF; and determining a location of the client device relative to the AP based on the direction of the LOS path and the distance.

12. The method of claim 11, wherein determining the direction of the LOS path comprises:
for each individual direction in a plurality of directions:
for each individual beam in the high-LOS-amplitude subset, calculating a respective gain of the individual beam for the individual direction; and
determining an aggregate gain for the individual direction based on the respective gains of the beams in the high-LOS-amplitude subset for the individual direction.

13. The method of claim 12, wherein determining the aggregate gain for the individual direction comprises:
for each individual beam in the high-LOS-amplitude subset:
determining a quotient by dividing the respective gain of the individual beam for the individual direction by a highest respective gain of any of the beams in the high-LOS-amplitude subset for the individual direction;
determining a product by multiplying the quotient by the respective amplitude of the LOS path for the individual beam; and
adding the product to a sum that represents the aggregate gain for the individual direction.

14. The method of claim 13, wherein determining the direction of the LOS path further comprises:
identifying a high-gain subset of the directions, wherein the aggregate gains for the directions included in the high-gain subset are greater than the aggregate gains for the directions that are not included in the high-gain subset;
determining an azimuth upper limit of the directions included in the high-gain subset;
determining an azimuth lower limit of the directions included in the high-gain subset;
determining an elevation upper limit of the directions included in the high-gain subset;
determining an elevation lower limit of the directions included in the high-gain subset; and
determining a centroid of a graphical region bounded by the azimuth upper limit, the azimuth lower limit, the elevation upper limit, and the elevation lower limit, wherein the direction of the LOS path is represented by an azimuth coordinate of the centroid and an elevation coordinate of the centroid.

15. The method of claim 11, wherein determining the ToF comprises:
receiving Time-of-Arrival (ToA) and Time-of-Departure (ToD) measurements for the radio frames;
identifying an exclusion subset within the plurality of beams, wherein, for each individual beam in the exclusion subset, the respective amplitude of the LOS path for the individual beam is less than the highest local maximum for the individual beam;
creating a refined set of ToA and ToD measurements by excluding ToA and ToD measurements for frames that were sent from the AP to the client device using beams included in the exclusion subset; and
determining the ToF based on the refined set of ToA and ToD measurements.

16. The method of claim 11, wherein a cardinality of the high-LOS-amplitude subset is predefined.

17. The method of claim 11, further comprising:
sending a wireless communication to the client device from the AP to indicate the location of the client device.

18. A non-transitory computer-readable storage medium containing instructions thereon that, when executed on a processor, perform the following:
receiving, at a wireless access point (AP), Channel Impulse Response (CIR) measurements for a plurality of directional beams used to exchange wireless communications between the AP and a client device;
for each individual beam in the plurality of directional beams, determining a respective amplitude of a Line-of-Sight (LOS) path between the AP and the client device based on a portion of the CIR measurements that corresponds to the individual beam by:
identifying a plurality of local maxima in a Power Delay Profile (PDP) for the individual beam;
identifying, from among the local maxima in the PDP, a highest local maximum for the individual beam; and
sanitizing the PDP by flattening any of the local maxima that are more than a threshold amount less than the highest local maximum, wherein a remaining local maximum that is first in time in the PDP after the sanitizing represents the respective amplitude of the LOS path;
identifying a high-LOS-amplitude subset of the beams, wherein the respective amplitudes of the LOS path for the beams included in the high-LOS-amplitude subset are greater than the respective amplitudes of the LOS path for the beams that are not included in the high-LOS-amplitude subset;
determining, based on predefined radiation patterns associated with the beams included in the high-LOS-amplitude subset, a direction of the LOS path between the AP and the client device;
determining a Time-of-Flight (ToF) for radio frames exchanged between the AP and the client device via the plurality of directional beams;
determining a distance between the AP and the client device based on the ToF; and
determining a location of the client device relative to the AP based on the direction of the LOS path and the distance.

* * * * *